United States Patent
Wang et al.

(10) Patent No.: US 7,793,897 B2
(45) Date of Patent: Sep. 14, 2010

(54) ELEVATING MECHANISM FOR FLAT-PANEL DISPLAY MONITOR AND PNEUMATIC CYLINDER USED FOR ELEVATING MECHANISM

(75) Inventors: Jin-Xin Wang, Shenzhen (CN); Ying-Jun Peng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 63 days.

(21) Appl. No.: 12/171,266

(22) Filed: Jul. 10, 2008

(65) Prior Publication Data

US 2009/0173845 A1    Jul. 9, 2009

(30) Foreign Application Priority Data

Jan. 9, 2008    (CN)    ................. 2008 1 0300055

(51) Int. Cl.
*A47F 5/00*    (2006.01)
*A47F 7/00*    (2006.01)
*F16M 11/00*    (2006.01)
*F16M 13/00*    (2006.01)

(52) U.S. Cl. .............. 248/125.2; 248/125.1; 248/125.8; 248/158; 248/161; 248/123.11; 248/280.11; 248/284.11; 248/281.11; 248/121; 248/132; 248/404; 248/157; 361/679.01; 361/679.02

(58) Field of Classification Search ......... 248/917–924, 248/125.8, 158, 161, 123.11, 125.2, 280.11, 248/284.11, 281.11, 121, 132, 404, 157, 248/125.1; 361/679.01, 679.02

See application file for complete search history.

(56) References Cited

U.S. PATENT DOCUMENTS

| 3,970,292 | A * | 7/1976 | Dachicourt et al. ...... 267/64.28 |
| 4,166,522 | A * | 9/1979 | Bourcier de Carbon ..... 188/287 |
| 4,548,389 | A * | 10/1985 | Smith et al. .............. 267/64.11 |
| 5,262,762 | A * | 11/1993 | Westover et al. ............ 345/168 |
| 6,397,761 | B1 * | 6/2002 | Moore ...................... 108/50.01 |
| 6,478,275 | B1 * | 11/2002 | Huang ..................... 248/284.1 |
| 6,857,610 | B1 * | 2/2005 | Conner et al. ............ 248/284.1 |
| 7,124,984 | B2 * | 10/2006 | Yokouchi et al. ......... 248/125.8 |
| 7,168,665 | B2 * | 1/2007 | Hong et al. .............. 248/125.1 |
| 7,195,214 | B2 * | 3/2007 | Lee et al. ................. 248/125.8 |
| 7,364,124 | B2 * | 4/2008 | Yuasa et al. .............. 248/125.8 |
| 7,389,963 | B2 * | 6/2008 | Cho et al. .................... 248/159 |
| 7,474,522 | B2 * | 1/2009 | Bliven ................... 361/679.22 |
| 7,510,155 | B2 * | 3/2009 | Huang et al. ............. 248/278.1 |
| 7,597,302 | B2 * | 10/2009 | Lee et al. .................... 248/371 |
| 7,628,371 | B2 * | 12/2009 | Gan et al. .................... 248/422 |
| 7,637,463 | B2 * | 12/2009 | Yen et al. .................... 248/157 |

(Continued)

*Primary Examiner*—J. Allen Shriver, II
*Assistant Examiner*—Nkeisha J Smith
(74) *Attorney, Agent, or Firm*—Zhigang Ma

(57) ABSTRACT

An exemplary elevating mechanism used for a flat-panel display monitor includes a support structure, a sliding structure, and a pneumatic cylinder. The support structure includes a pair of guide rails. The sliding structure is mounted to the support structure and is capable of sliding along the guide rails. The pneumatic cylinder includes a cylinder body, a piston shaft, and a first piston. The cylinder body is connected to the support structure. The piston shaft includes a first end received in the cylinder body, and a second end opposite to the first end connected to the sliding structure. The first piston is positioned in the cylinder body and partitions the cylinder body into two chambers. The two chambers are filled with gas. The first piston is fixed to the first end of the piston shaft and defines a through hole for communicating the two chambers.

12 Claims, 7 Drawing Sheets

U.S. PATENT DOCUMENTS

| | | | |
|---|---|---|---|
| 2004/0011932 A1* | 1/2004 | Duff | 248/157 |
| 2005/0156092 A1* | 7/2005 | Shepherd et al. | 248/404 |
| 2005/0194499 A1* | 9/2005 | Drew et al. | 248/125.1 |
| 2005/0205731 A1* | 9/2005 | Shimizu et al. | 248/176.3 |
| 2006/0185563 A1* | 8/2006 | Sweere et al. | 108/28 |
| 2007/0146987 A1* | 6/2007 | Sakata et al. | 361/683 |
| 2009/0001239 A1* | 1/2009 | Dong et al. | 248/393 |
| 2009/0230261 A1* | 9/2009 | Su | 248/161 |

* cited by examiner

ELEVATING MECHANISM FOR FLAT-PANEL DISPLAY MONITOR AND PNEUMATIC CYLINDER USED FOR ELEVATING MECHANISM

BACKGROUND

1. Field of the Invention

The present invention generally relates to elevating mechanisms, and particularly, to an elevating mechanism for a flat-panel display monitor and a pneumatic cylinder for adjusting the height of the elevating mechanism.

2. Discussion of the Related Art

Display devices of the computers come in a variety of sizes, shapes, and weights. Flat-panel display monitors, such as liquid crystal display (LCD) monitors, are widely used because of their thin bodies and light weight.

LCD monitors can also be versatile. Generally, the height of the flat-panel display monitor can be adjusted via an elevating mechanism.

Referring to FIG. 7, a typical elevating mechanism 100 includes a support member 10, a mounting bracket 20, and a coil spring 30. The support member 10 includes an elongated main portion (not labeled), and two side portions (not labeled) extending from opposite sides of the elongated main portion. The main portion and the side portions cooperatively define a receiving groove 11 for mounting the mounting bracket 20. Two guide rails 12 are formed on opposite inner surfaces of the side portions. The support member 10 further defines two fixing holes 13 adjacent to top ends of the side portions.

The mounting bracket 20 includes a middle portion (not labeled), two sliding portions (not labeled) extending from opposite sides of the middle portion, and a connecting portion 21 connected to an end of the middle portion. The middle portion defines two threaded holes 22 in another end of the middle portion opposite to the connecting portion 21. The two sliding portions are configured to engage in the guide rails 12 of the support member 10 so that the mounting bracket 20 is slidable in the receiving groove 11.

The coil spring 30 includes a first end coiled to a shaft 31 and a second end opposite to the first end defining two through holes 32. The shaft 31 defines two fixing holes 311 in opposite ends of the shaft 31. The shaft 31 is fixed to the support member 10 by using screws 33 to pass through the fixing holes 311 and screwed into the two corresponding fixing holes 13 of the support member 10. The second end of the coil spring 30 is fixed to the mounting bracket 20 by using screws 36 to pass through the through holes 32 and screwed into the corresponding threaded holes 22.

The connecting portion 21 of the mounting bracket 20 supports a flat-panel display (not shown). To lower the height of the flat-panel display, an external force is applied to the flat-panel display causing the mounting bracket 20 to slide downwards relative to the support member 10. When the mounting bracket 20 slides to a desired position, the external force is released. The mounting bracket 20 with the flat-panel display remains in the desired position by an elastic force from the coil spring 30 and a friction force created between the mounting bracket 20 and the support member 10. To raise the height of the flat-panel display, another external force is applied to the flat-panel display for lifting the mounting bracket 20 to slide upwards relative to the support member 10 to another desired position.

However, the support member 10 and the mounting bracket 20 are generally heavy. In addition, the conventional elevating mechanism 100 has a relatively short usage life because the coil spring 30 damages easily when it is frequently operated. Furthermore, a user needs to exert great force to the flat display to overcome the friction force created between the mounting bracket 20 and the support member 10.

Therefore, a new elevating mechanism for a flat-panel display monitor is desired to overcome the above-described shortcomings.

SUMMARY

An elevating mechanism used for a flat-panel display monitor includes a support structure, a sliding structure, and a pneumatic cylinder. The support structure includes a pair of guide rails. The sliding structure is mounted to the support structure and is capable of sliding along the guide rails.

The pneumatic cylinder includes a cylinder body, a piston shaft, and a first piston. The cylinder body is connected to the support structure. The piston shaft includes a first end received in the cylinder body, and a second end opposite to the first end connected to the sliding structure. The first piston is positioned in the cylinder body and partitions the cylinder body into two chambers. The two chambers are filled with gas. The first piston is fixed to the first end of the piston shaft and defines a through hole for communicating the two chambers.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of an elevating mechanism for a flat-panel display monitor and a pneumatic cylinder used as the elevating mechanism. Moreover, in the drawings, like reference numerals designate corresponding parts throughout the several views.

DETAILED DESCRIPTION OF THE EMBODIMENTS

Reference will now be made to the drawings to describe embodiments of the present elevating mechanism in detail.

Figure 1:
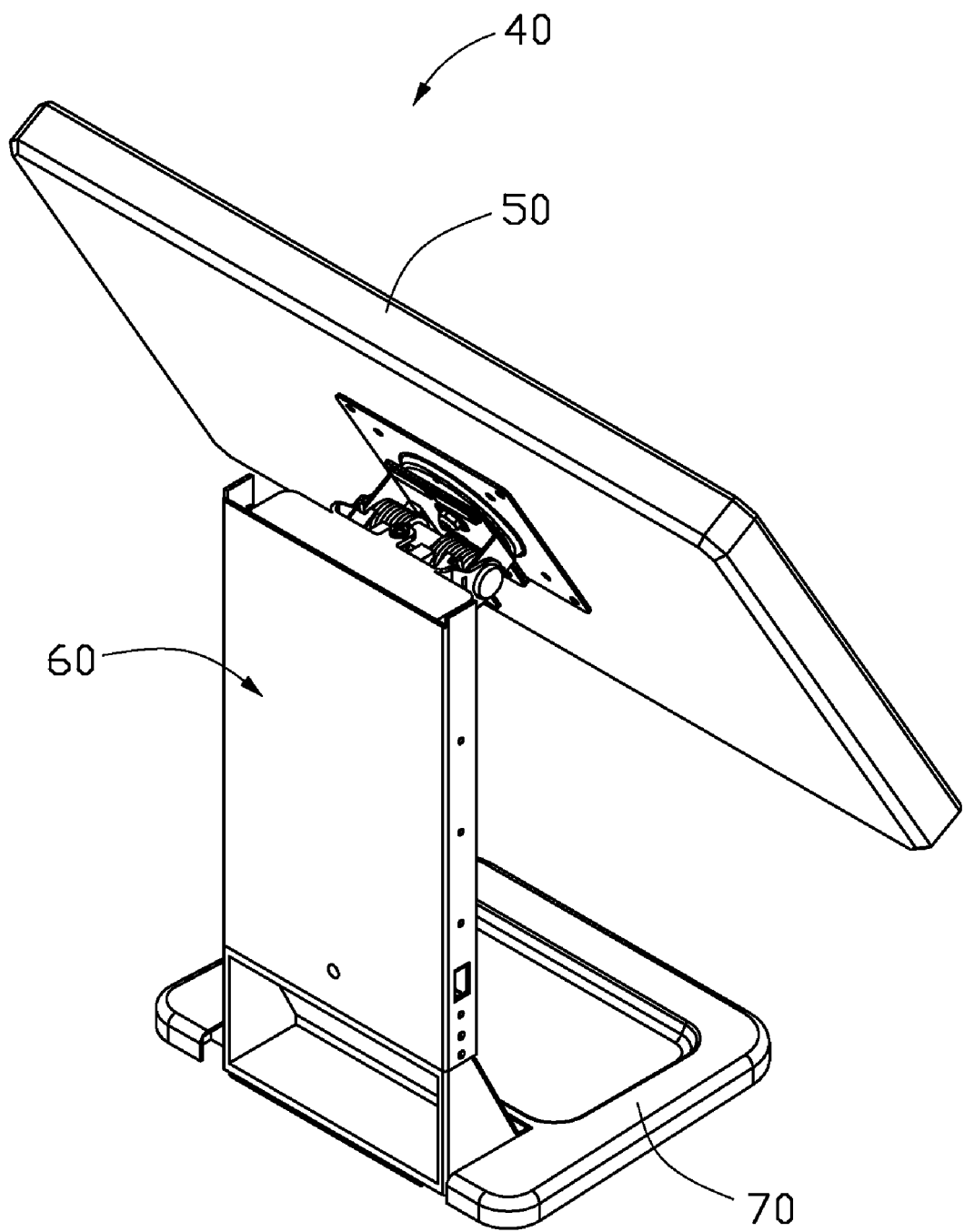
FIG. 1 is an assembled, isometric view of one embodiment of a flat-panel display monitor with an elevating mechanism.

Referring to FIG. 1, a flat-panel display monitor 40 includes a flat-panel display 50, an elevating mechanism 60, and a base member 70. The elevating mechanism 60 adjustably connects the flat-panel display 50 and the base member 70.

Figure 2:
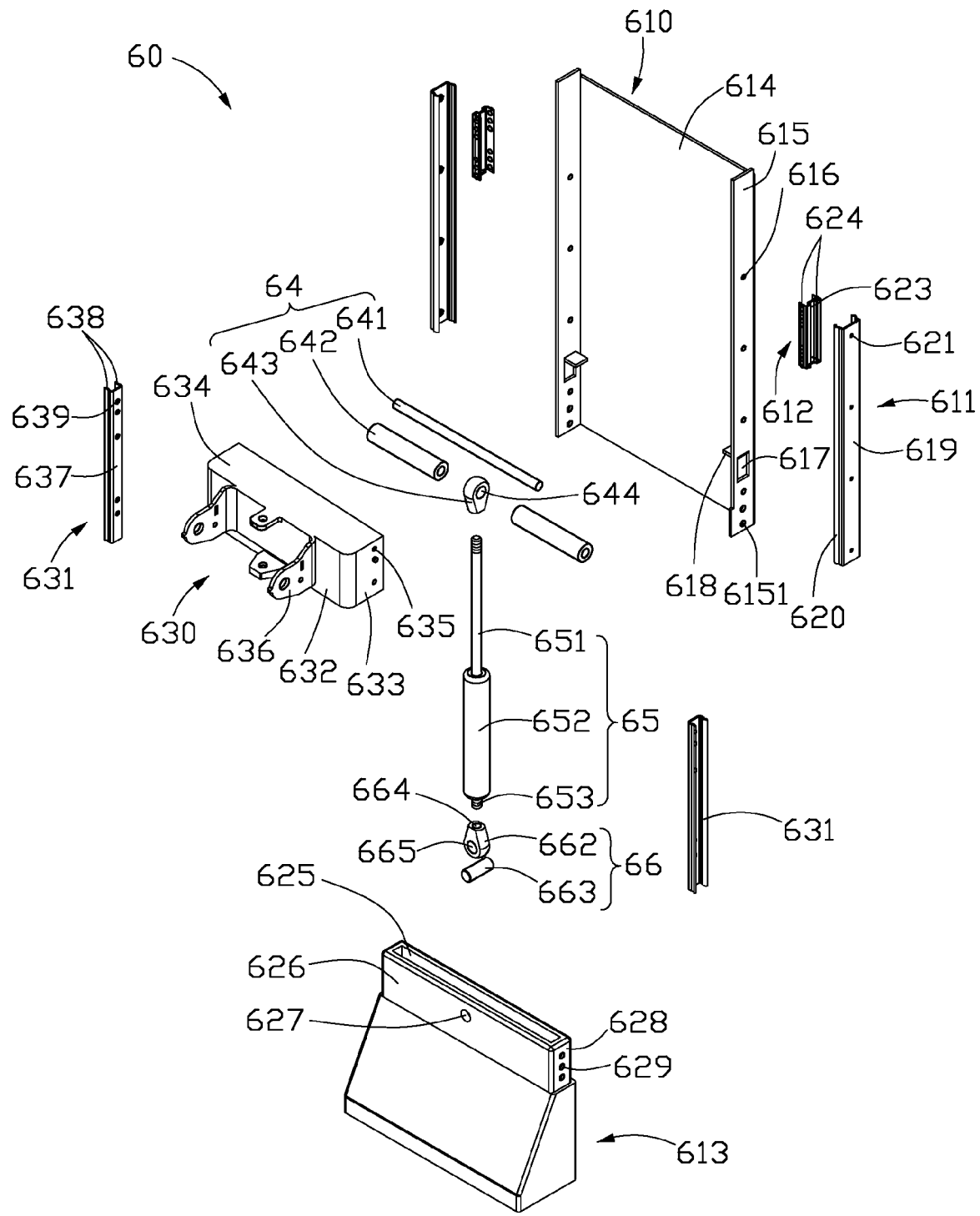
FIG. 2 is an exploded, isometric view of the elevating mechanism in FIG. 1.
Figure 3:
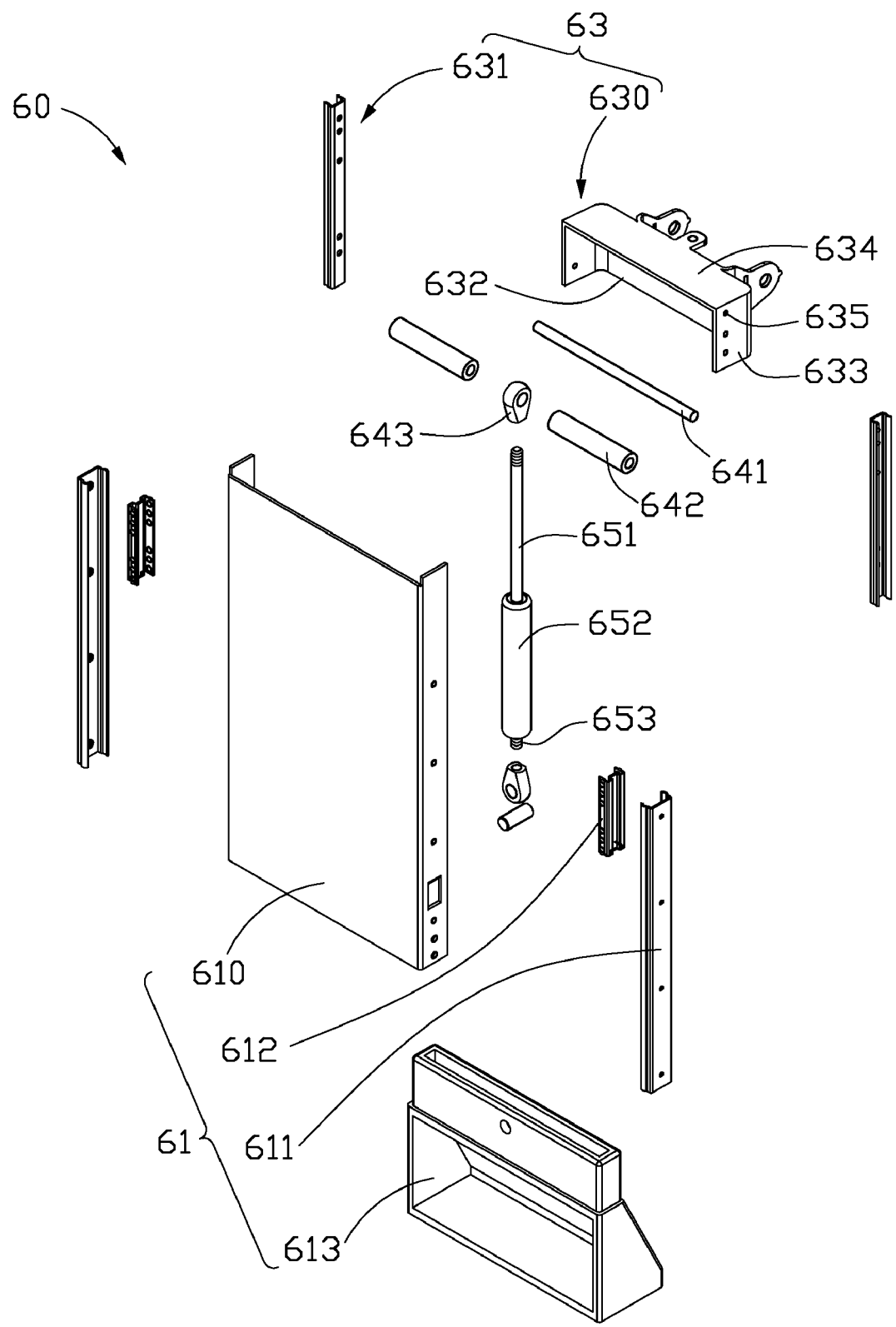
FIG. 3 is an inverted, exploded, isometric view of the elevating mechanism in FIG. 1.

Referring to FIGS. 2 and 3, the elevating mechanism 60 includes a support structure 61, a sliding structure 63, a first linking module 64, a pneumatic cylinder 65, a second linking module 66 and a plurality of fixing members (not shown).

Figure 4:
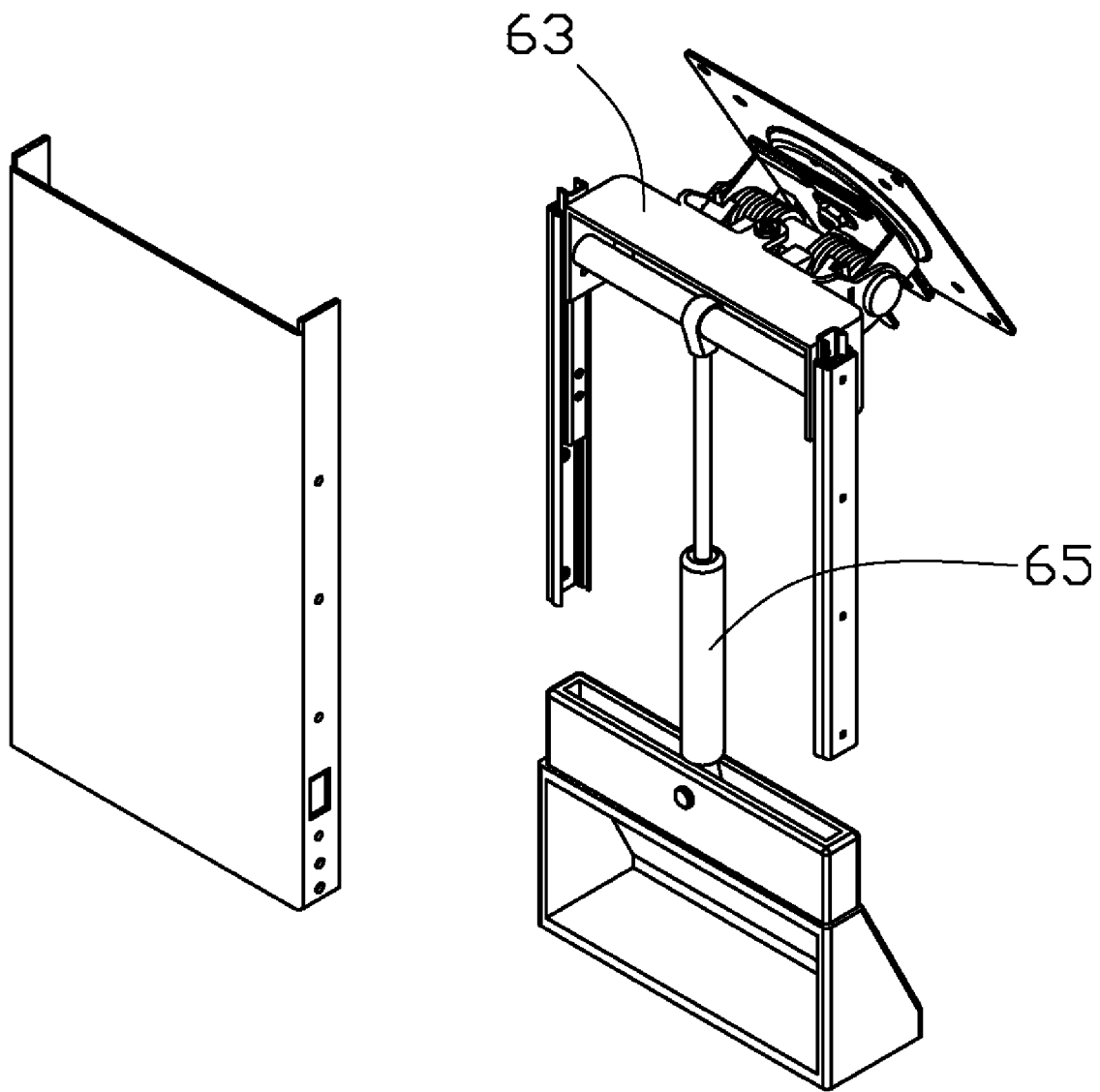
FIG. 4 is a partially assembled, isometric view of the elevating mechanism in FIG. 3.

Referring also to FIG. 4, the support structure 61 includes a mounting bracket 610, two guide rails 611, two friction members 612, and a support bracket 613. The mounting bracket 610 includes a main portion 614 and two side portions 615 perpendicularly extending from opposite sides of the main portion 614. Each of the side portions 615 defines a plurality of fixing holes 616 adjacent to a center of the side portion 615, a plurality of positioning holes 6151 adjacent to an end of the side portion 615, and a rectangular hole 617 between the fixing holes 616 and the positioning holes 6151. Each of the side portions 615 includes a rectangular block piece 618 extending inwards from an edge of the rectangular hole 617.

Each guide rail 611 includes a base wall 619 and two side walls 620 perpendicularly extending from opposite sides of the base wall 619. The base wall 619 defines a plurality of through holes 621 corresponding to the fixing holes 616, such that the guide rails 611 can be fixed to the inner sides of the corresponding side portions 615 by fixing members, such as screws.

Each friction member 612 includes a base portion 623 and two side portions 624 perpendicularly extending from opposite sides of the base portion 623. Each friction member 612 includes a plurality of ball-shaped protrusions (not labeled) positioned at opposite surfaces of each side portion 624.

The support bracket 613 defines a rectangular mounting groove 625 in a top portion. The support bracket 613 includes a pair of parallel first side walls 626 and a pair of parallel second side walls 628 surrounded the mounting groove 625. Each first side wall 626 is longer than each second side wall 628 and defines a through hole 627 in a middle. Each second side wall 628 defines a plurality of fixing holes 629 corresponding to the positioning holes 6151 so that the mounting bracket 610 can be connected to the support bracket 613 by fixing members, such as screws.

The sliding structure 63 includes a sliding bracket 630 and two slide rails 631. The sliding bracket 630 includes a rectangular base 632, two side walls 633 perpendicularly extending from opposite sides of the base 632, and a top cover 634 perpendicularly extending from a top side of the base 632. The top cover 634 is also perpendicularly connected to the side walls 633. Each side wall 633 defines a plurality of fixing holes 635. The sliding bracket 630 further includes a plurality of connecting pieces 636 extending outwards from the base 632 configured for connecting the flat-panel display 50 to the sliding structure 63. Each of the slide rails 631 includes a rectangular base wall 637 and two side walls 638 perpendicularly extending from opposite sides of base wall 637. The base wall 637 defines a plurality of through holes 639 corresponding to the fixing holes 635 so that the slide rails 631 can be fixed to the corresponding side walls 633.

The first linking module 64 includes a shaft 641, two sleeves 642, and a connecting member 643. The shaft 641 is cylindrical. The sleeves 642 are hollow cylinders and can be sleeved on the shaft 641. The connecting member 643 defines a shaft hole 644 extending through a side portion for the shaft 641. The connecting member 643 also defines a threaded hole (not labeled) in a bottom portion. A central axis of the threaded hole is substantially perpendicular to a central axis of the shaft hole 644.

Figure 6:
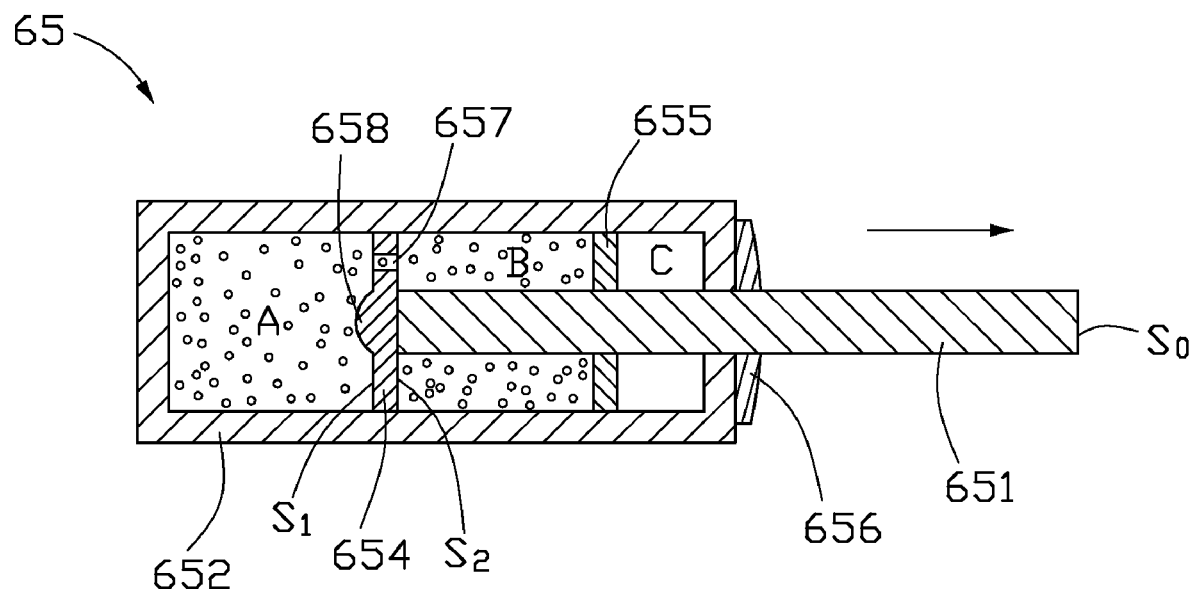
FIG. 6 is a cross-sectional view of a pneumatic cylinder used for the elevating mechanism in FIG. 2.
Figure 7:
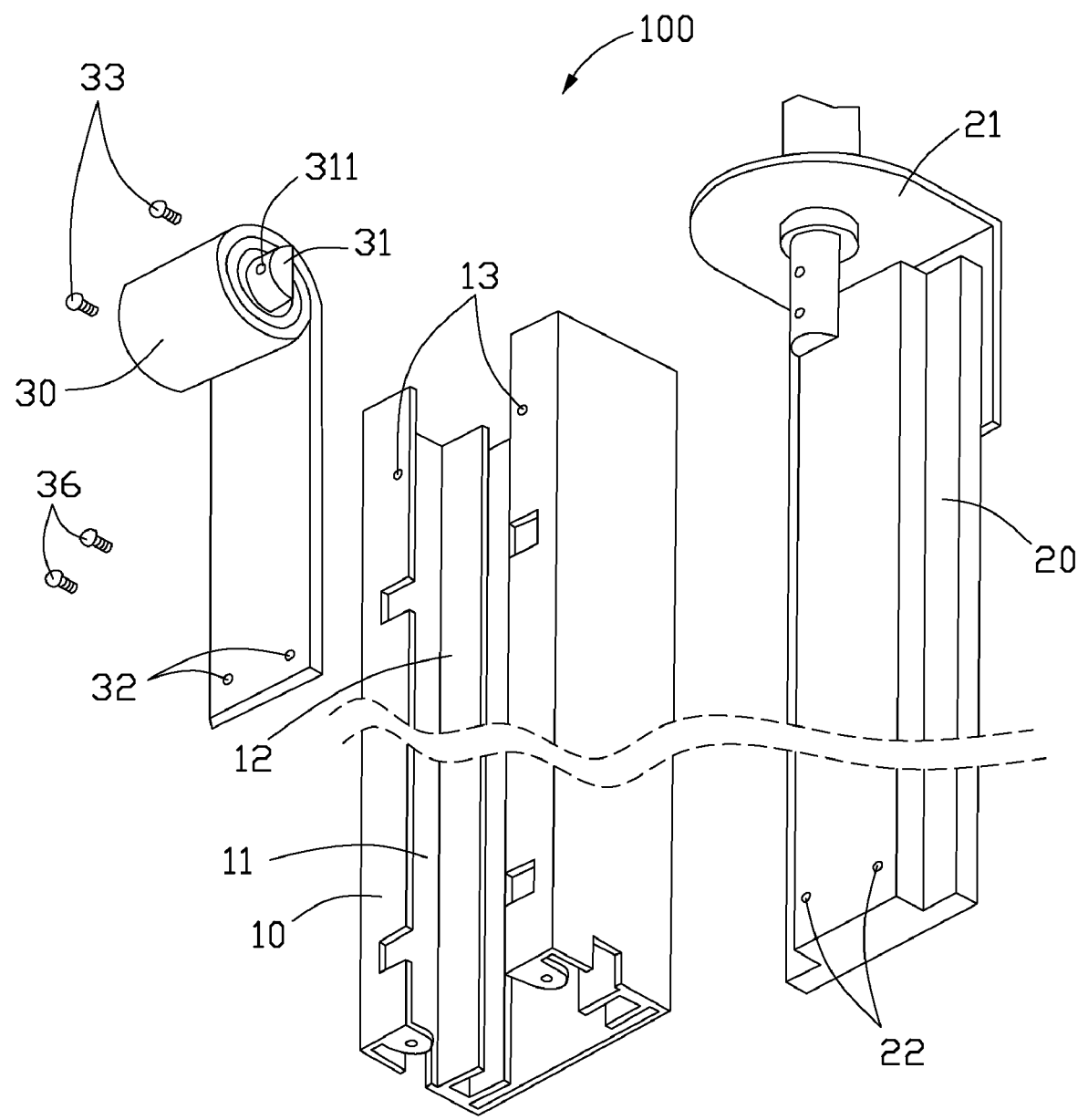
FIG. 7 is an exploded, isometric view of a conventional elevating mechanism.

Referring also to FIG. 6, the pneumatic cylinder 65 includes a piston shaft 651, a cylinder body 652, a connecting portion 653 (see FIG. 2), a first piston 654, a second piston 655, and a ring seal 656. The first piston 654 and the second piston 655 are positioned in the cylinder body 652 and partition the cylinder body 652 into three chambers A, B, and C. The chambers A and B are filled with gas to a predetermined pressure, and the chamber C is filled with oil for preventing the gas from escaping out of the chambers A and B. The first piston 654 defines a through hole 657 extending through so the chamber A is in fluid communication with the chamber B. The piston shaft 651 is partially received in the cylinder body 652 from an end of the cylinder body 652 adjacent to the chamber C. The connecting portion 653 is a threaded portion extending from an end of the cylinder body 652 adjacent to the chamber A. The first piston 654 is fixed to an end of the piston shaft 651, and the second piston 655 is movably sleeved on the piston shaft 651. The first piston 654 includes a spherical portion 658 formed at an end surface, extending towards the first chamber A. The spherical portion 658 is configured to prevent the whole end surface of the first piston 654 from abutting an inner bottom surface of the cylinder body so that the volume of the gas in the chamber A can never be zero. The ring seal 656 is sleeved on the piston shaft 651 and abuts an end of the cylinder body 652 adjacent to the chamber C, thereby preventing the oil from leaking out of the chamber C.

The second linking module 66 includes a connecting member 662 and a pin 663. The connecting member 662 is similar in principle to the connecting member 643. The connecting member 662 defines a threaded hole 664 in a top portion and a pin hole 665 extending through a side portion for the pin 663. A central axis of the threaded hole 664 is substantially perpendicular to a central axis of the pin hole 665. The threaded hole 664 is configured for engaging with the connecting portion 653 of the pneumatic cylinder 65.

Figure 5:
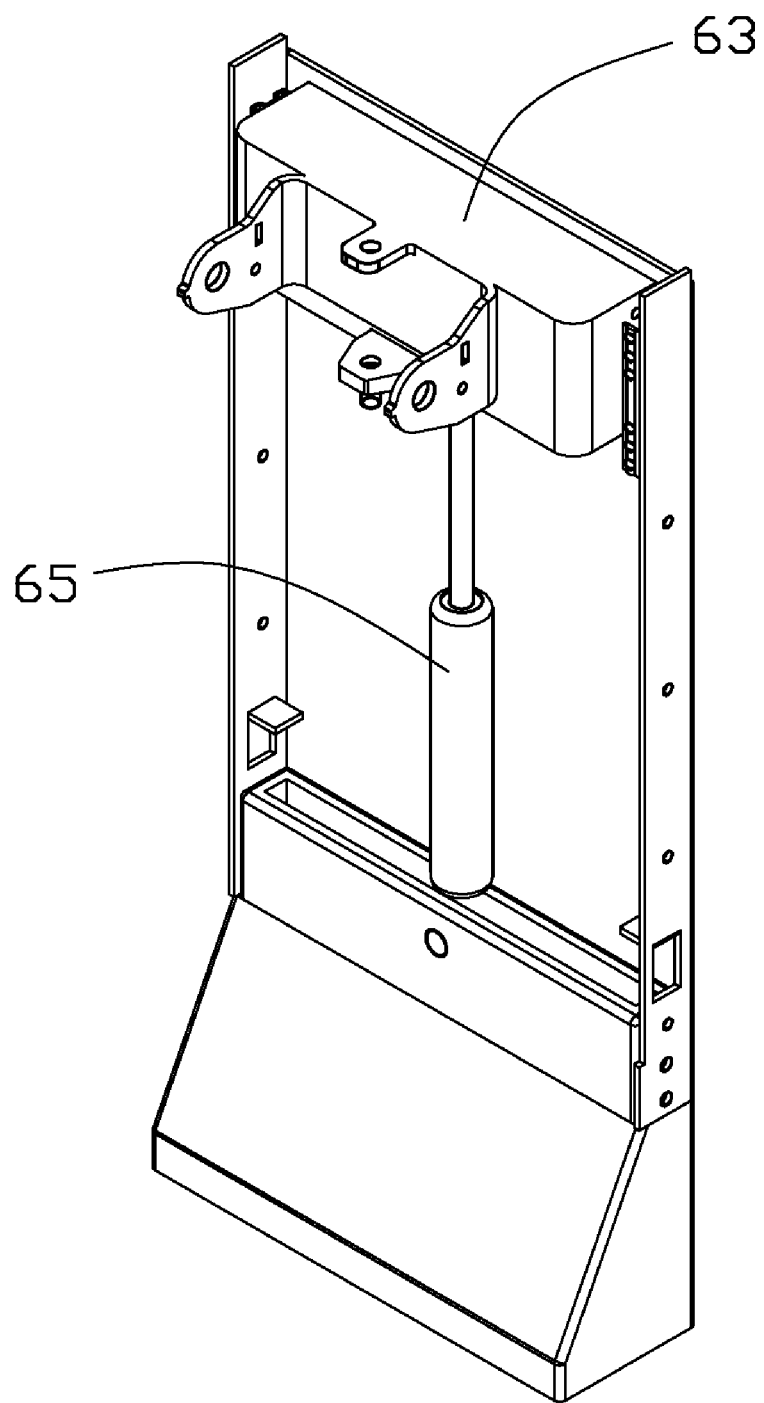
FIG. 5 is an assembled, isometric view of the elevating mechanism in FIG. 2.

Referring also to FIG. 5, the elevating mechanism 60 is assembled by fixing the guide rails 611 to the corresponding inner sides of the side portions 615 with fasteners, such as screws. An end of each guide rail 611 should abut the block piece 618. The friction members 612 are slidably received in the corresponding guide rails 611, and the base portion 623 of each friction member 612 abuts the corresponding base wall 619. The slide rails 631 are fixed to the corresponding side walls 633 of the sliding bracket 630. The shaft 641 is passed through the shaft hole 644 of the connecting member 643, and the two sleeves 642 are sleeved on the shaft 641 adjacent to opposite sides of the connecting member 643. Opposite ends of the shaft 641 are passed through the fixing holes 635 and latched in the corresponding through holes 639. The slide rails 631 are latched to the corresponding friction members 612, and the base wall 637 of each slide rail 631 is positioned adjacent to the base portion 623 of the corresponding friction member 612. Thus each slide rail 631, together with the corresponding friction member 612, is capable of sliding in the corresponding guide rail 611. An end of the piston shaft 651 is screwed into the threaded hole of the connecting member 643 to connect the sliding structure 63 to the pneumatic cylinder 65. The connecting portion 653 of the pneumatic cylinder 65 is screwed into the threaded hole 664 of the connecting member 662. The connecting member 662 is received in the mounting groove 625 of the support bracket 613. The pin 663 is passed through the through holes 627 and the pin hole, to fixedly connect an end of the pneumatic cylinder 65 to the support bracket 613. The flat-panel display 50 is fixed to the connecting pieces 636 so that the flat-panel display 50 moves with the sliding structure 63 relative to the support structure 61.

The principle and work process of the pneumatic cylinder 65 will be illustrated in detail.

In the following description, $P_0$ represents the pressure of the gas in the chambers A and B, $S_0$ represents an area of a cross-section of the piston shaft 651, $S_1$ represents an area of a cross-section of the first piston 654, $S_2$ represents an area of an surface of the first piston 654 in the chamber B. The pressure $P_0$ is actually much larger than the atmospheric pressure, thus the effect of the atmospheric pressure on the pneumatic cylinder 65 does not need to be considered. According to the theory of physics, $$F_1 = P_0 S_1,$$

$$F_2 = P_0 S_2,$$

wherein $F_1$ represents a pressure force on the first piston 654 created by the gas in the chamber A and $F_2$ represents a pressure force on the first piston 654 created by the gas in the chamber B.

The relations of the area $S_0$, the area $S_1$, and the area $S_2$ are as follows:

$$S_2 = S_1 - S_0, \text{ thus}$$

$$F_2 = P_0 S_2 = P_0 (S_1 - S_0)$$

If $\Delta F$ represents a difference value between the pressures of the two sides of the first piston 654, thus, $$\begin{aligned}\Delta F &= F_1 - F_2 \\ &= P_0 S_1 - P_0 S_2 \\ &= P_0 (S_1 - S_2) \\ &= P_0 [S_1 - (S_1 - S_0)] \\ &= P_0 S_0\end{aligned}$$

The above formulas shows that, if the chambers A, B is filled with gas having a predetermined pressure $P_0$, a pressure force $\Delta F$ will be created on the first piston 654. The pressure force $\Delta F$ is determined by the pressure $P_0$ of the gas in the chambers A and B and the area $S_0$. Thus, the pressure force $\Delta F$ can be adjusted by adjusting the pressure $P_0$ and the area $S_0$.

The elevating mechanism 60 utilizes the principle and work process of the pneumatic cylinder. The chamber A communicates with the chamber B via the through hole 657 of the first piston 654, so the pressure of the gas in the chambers A and B are equal at a predetermined pressure, $P_0$. If the position of the second piston 655 does not change, the total volume and pressure of the gas in the chambers A and B will remain the same, and the pressure force $\Delta F$ is changeless. To lower the flat-panel display 50 relative to the base member 70, an external force is applied on the flat-panel display monitor pressing the sliding structure 63 to slide downwards relative to the mounting bracket 610. Because the piston shaft 651 is connected to the sliding structure 63, the piston shaft 651 moves with the first piston 654, and the volume of the chamber A is accordingly decreased because of the motion of the first piston 654. When the sliding structure 63 slides downwards to a desired position, the external force is released, the pressure force $\Delta F$ and a fiction force created between the guide rails 611 and the slide rails 631 counter-balance the weight of the sliding structure 63 and the flat-panel display 50. Thus, the sliding structure 63 with the flat-panel display 50 can be retained at the predetermined position by the pressure force $\Delta F$ and the fiction force. Similarly, to raise the flat-panel display 50 relative the base member 70, another external force is applied on the flat-panel display monitor 50 for lifting the sliding structure 63 to slide upwards relative to the mounting bracket 610 to another desired position.

The pressure $P_0$ can be changed by changing the position of the second piston 655 to increase or decrease the total volume of the gas in the chambers A, B, thereby adjusting the pressure force $\Delta F$. Therefore, the elevating mechanism 60 can be used for flat-panel display monitors having different weights by adjusting the pressure force $\Delta F$. Alternatively, the second piston 655 can be omitted, and the pressure $P_0$ can be adjusted by further injecting gas into the chambers A, B.

The pneumatic cylinder 65 of the elevating mechanism 60 has a relatively small size and weight, thereby decreasing the overall size and weight of the elevating mechanism 60. In addition, the pneumatic cylinder 65 of the elevating mechanism 60 generally has a longer usage life than a coil spring. Furthermore, when the elevating mechanism 60 is used for flat-panel display monitors having different weights, the pressure force $\Delta F$ created by the pneumatic cylinder 65 can be conveniently adjusted by the second piston 655.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An elevating mechanism for a flat-panel display monitor, comprising:
    a support structure including a pair of guide rails, a mounting bracket and a support bracket, wherein the mounting bracket includes a main portion and two side portions perpendicularly extending from opposite sides of the main portion, the guide rails to the side portions of the mounting bracket, the mounting bracket being fixedly connected to the support bracket;
    a sliding structure mounted to the support structure and capable of sliding along the guide rails; and
    a pneumatic cylinder including:
        a cylinder body connected to the support structure;
        a piston shaft having a first end received in the cylinder body, and a second end opposite to the first end connected to the sliding structure; and
        a first piston positioned in the cylinder body and partitioning the cylinder body into two chambers wherein the two chambers are filled with gas; the first piston is fixed to the first end of the piston shaft; the first piston defines a through hole for communicating the two chambers.

2. The elevating mechanism of claim 1, wherein the pneumatic cylinder further comprises a second piston received in the cylinder body and adjustably sleeved on the piston shaft; the first piston and the second piston partition the cylinder body into three chambers; two of the three chambers adjacent to opposite sides of the first piston are filled with gas; the chamber away from the first piston is filled with oil.

3. The elevating mechanism of claim 2, wherein the pneumatic cylinder further comprises a ring seal sleeved on the piston shaft and abutting an end of the cylinder body adjacent to the second piston.

4. The elevating mechanism of claim 1, wherein the first piston comprises a spherical portion formed at an end surface, extending towards an end of the cylinder body opposite to the first end of the piston shaft.

5. The elevating mechanism of claim 1, wherein the support structure further comprises two friction members; each friction member includes a base portion and two side portions perpendicularly extending from opposite sides of the base portion; each friction member includes a plurality of ball-shaped protrusions positioned at opposite surfaces of each side portion; each guide rail includes a base wall and two side walls perpendicularly extending from opposite sides of the base wall; the friction members are slidably received in the corresponding guide rails respectively; the base portion of each friction member abuts the base wall of the corresponding guide rail.

6. The elevating mechanism of claim 5, wherein the sliding structure comprises a sliding bracket and two slide rails; the sliding bracket includes a base and two side walls perpendicularly extending from opposite sides of the base; the slide rails are fixed to the corresponding side walls of the sliding bracket and latched to the corresponding friction members so that each of the slide rails together with the corresponding friction member is capable of sliding in the corresponding guide rail.

7. The elevating mechanism of claim 6, wherein the sliding structure further comprises a plurality of connecting pieces extending outward from the base of the sliding bracket for connecting a flat-panel display to the sliding structure.

8. An elevating mechanism for a flat-panel display monitor, comprising:
   a support structure including a pair of guide rails;
   a sliding structure mounted to the support structure and capable of sliding along the guide rails;
   a pneumatic cylinder including:
      a cylinder body connected to the support structure;
      a piston shaft having a first end received in the cylinder body, and a second end opposite to the first end connected to the sliding structure; and
      a first piston positioned in the cylinder body and partitioning the cylinder body into two chambers wherein the two chambers are filled with gas; the first piston is fixed to the first end of the piston shaft; the first piston defines a through hole for communicating the two chambers; and
   a first linking module for connecting the sliding structure to the pneumatic cylinder, wherein the first linking module includes a shaft and a connecting member, the shaft extends through the connecting member, opposite ends of the shaft are fixed to the sliding structure; the second end of the piston shaft is fixed to the connecting member.

9. The elevating mechanism of claim 8, wherein the pneumatic cylinder further comprises a second piston received in the cylinder body and adjustably sleeved on the piston shaft; the first piston and the second piston partition the cylinder body into three chambers; two of the three chambers adjacent to opposite sides of the first piston are filled with gas; the chamber away from the first piston is filled with oil.

10. The elevating mechanism of claim 9, wherein the pneumatic cylinder further comprises a ring seal sleeved on the piston shaft and abutting an end of the cylinder body adjacent to the second piston.

11. The elevating mechanism of claim 8, wherein the first piston comprises a spherical portion formed at an end surface, extending towards an end of the cylinder body opposite to the first end of the piston shaft.

12. The elevating mechanism of claim 8, further comprising a second linking module, wherein the second linking module comprises a connecting member and a pin; the connecting member defines a pin hole in a side portion; the support bracket defines a through hole therein; the pin extends through the pin hole and the through hole of the support bracket thereby fixing the connecting member to the support bracket; the pneumatic cylinder further comprises a connecting portion formed at an end of the cylinder body away from the piston shaft; the connecting portion of the pneumatic cylinder is fixed to the connecting member.

* * * * *